Patented Aug. 1, 1944

2,354,672

UNITED STATES PATENT OFFICE 2,354,672

NITROGENOUS RESIN FROM CATECHOL TYPE TANNINS

John W. Eastes, Philadelphia, Pa., and Charles Averill, Boston, Mass., assignors to The Resinous Products & Chemical Company, Philadelphia, Pa., a corporation of Delaware No Drawing. Application April 9, 1941, Serial No. 387,685

17 Claims. (Cl. 260—45)

This invention relates to resinous compositions suitable for ion exchange and the purification of gases. In particular, it relates to the insoluble reaction products obtained from the condensation of alkylene polyamines, formaldehyde, and natural tannins of the catechol type.

It has heretofore been accepted that resinous condensates are not obtained from a phenol, formaldehyde, and simple non-aromatic amines when there is present in the phenol an acidic constituent. While this is generally true, it is now found that there is an exception to this rule in the case of certain phenolic bodies which occur in natural tannins.

It has now been found that tannins of the catechol type may be reacted with formaldehyde and alkylene polyamines to form resins having anion exchange capacity and giving good performance for the absorption of acidic constituents in the purification of liquids and gases under conditions of repeated regeneration and use. These resins are formed by condensing an alkylene polyamine and a tannin of the catechol type with formaldehyde so as to form a gel and heating this gel to form an insoluble resin at a temperature between about 70° C. and the scorching temperature of the resin, i. e., the temperature at which incipient decomposition occurs.

The tannins which have been found suitable for the preparation of resinous compositions suitable for anion exchange are those characterized by a 1,2-dihydroxy aromatic nucleus which are, therefore, conveniently referred to as "catechol-type tannins." These include tannins, identified by reference to their sources, known as quebracho, wattle bark, hemlock, mangrove, oak bark, Borneo cutch, and gambier. The usual commercial tannins of the catechol type contain about 25% to about 70% of active phenolic material. A typical analysis of a quebracho tannin shows active tannins 63%, non-tannins 7%, insolubles 7%, and moisture 23%. Commercial materials of the catechol type, all those named having been examined, are capable of forming resinous compositions useful for ion exchange and gas purification. Mixtures of such tannins may also be used.

As a polyamine for the preparation of the resinous compositions herein claimed, there may be used any amine having at least two nitrogen atoms which have hydrogen atoms attached thereto and which are separated by an alkylene chain of at least two carbon atoms. The effective amines may also be defined by the term "alkylene polyamine," the alkylene chain of which may be interrupted by at least one —NH— to form alkylene chains of at least two carbon atoms each between nitrogen atoms. These polyamines include ethylene diamine, propylene diamine, diethylene triamine, triethylene tetramine, tetraethylene pentamine, N,N'-bis(aminopropyl)ethylene diamine, di(trimethylene)triamine, etc.

To react with the tannin and alkylene polyamine there is used formaldehyde in the form of a gas, a solution in water or organic solvent, or a polymer, such as paraformaldehyde. Part of the formaldehyde requirements may also be supplied with hexamethylene-tetramine or other compound yielding methylene groups. The amount of formaldehyde required varies with the tannin used. In preferred compositions the mols of formaldehyde should be at least equal to the sum of the mols of polyamine and of phenolic bodies from the tannins.

The proportions of the various reactants have some influence on the utility of the resinous compositions obtained therefrom. Excess formaldehyde, for example, helps to impart insolubility and hardness. Hardness, however, is primarily determined by the proportion of tannin used. With higher proportions the hardness increases, but at the same time the capacity for absorption of anions tends to fall off. This capacity persists over the widest range of proportion for tannins to polyamine, increasing with proportion of polyamine used. Thus, a resin made with formaldehyde and with 100 parts of a catechol-type tannin to 11.5 parts of triethylene tetramine had a capacity of 70 milligrams of sulfuric acid per gram of resin; a resin with 100 parts of tannin and 23 parts of the same amine had a capacity of 120 milligrams; a resin with 100 parts of tannin and 46 parts of the same amine had a capacity of 225 milligrams; and a resin with 100 parts of tannin to 92 parts of the same amine had a capacity of 245 milligrams. All of these resins had good physical properties and remained essentially insoluble in dilute acids. Further increases in the ratio of amine do not contribute proportionally to the effectiveness of the resin and with excessive ratios of amine the resin becomes soft and may bleed into a liquid being treated. Although no exact upper ratio of amine to tannin can be set, since this limit depends also on proportion of formaldehyde, the tannin selected, and conditions of reaction, usually resins containing less than two parts by weight of polyamine to one part of tannin are to be desired.

In general it is desirable in reacting the three main components to carry out the reaction in the presence of sufficient water to dissolve the soluble portion of the catechol-type tannin at 50° C. In the initial stages of the reaction, however, both formaldehyde and polyamine have a solubilizing influence on the tannin and it is not essential to have all of the tannin initially in solution. The important consideration is to so react the materials that there is no separation of an insoluble product, but formation of a hydrophilic, resinous gel.

The order of addition of the reactants has little effect on the value of the resins obtained. In the preferred procedures tannin and amine are mixed with formaldehyde, or tannin and formaldehyde are mixed with amine. The reacting mixtures may be adjusted to a wide range of hydrogen ion concentrations without altering the capacity of the final resin. When the reaction is performed on the acid side, however, rather unexpectedly the physical properties are generally best. When the reaction is to be accomplished at a pH below 7, the polyamine may be used in the form of an acid salt, at least in part. If it is desired to perform the reaction under alkaline conditions, it is most convenient to add an alkali, such as sodium hydroxide, to the tannin. As another variation in procedure, a soluble condensate of tannin, formaldehyde, and polyamine may be first formed and an additional amount of formaldehyde, hexamethylene tetramine, or paraformaldehyde reacted therewith. This mode of procedure gives an especially useful resinous condensation.

The preparation of resinous compositions from tannins of the catechol-type, formaldehyde and an alkylene polyamine is illustrated by the following examples. Parts shown are by weight.

*Example 1*

100 parts of commercial quebracho was taken up in 200 parts of water and heated to 95° C. to dissolve most of the material. Thereupon 73 parts of triethylene tetramine was added with stirring, the mixture cooled to 40° C., and 162 parts of aqueous 37% formaldehyde was added. The temperature rose rapidly to about 60° C. with formation of a gel which was heated for two hours on a steam bath. The gel was then removed from the reaction vessel and heated in an oven at 130° C. for 16 hours. A black, resinous material resulted. This was crushed, screened to 20/40 mesh, washed with water, with a 5% solution of sodium carbonate, and again with water, and dried at 50° C. The capacity of this product was 90 milligrams of sulfuric acid per gram under conditions of flow through a column packed with the product.

*Example 2*

100 parts of quebracho (brought to a pH of 7 with 10% sodium hydroxide solution), 23 parts of triethylene tetramine, 200 parts of water and 108 parts of 37% aqueous formaldehyde solution were mixed, and heated at 95° C. for an hour to form a gel. The gel was heated on a tray in an oven at 130° C. for 16 hours, washed with water, with a 5% soda ash solution, and again with water, and air-dried. The resulting product had good physical properties for use in large scale apparatus and absorbed 108 milligrams of sulfuric acid per gram when used in a column under conditions of continuous flow.

*Example 3*

100 parts of quebracho was taken up in 200 parts of water and this solution adjusted to pH 8.5 by the addition of about 20 parts of 10% sodium hydroxide solution. There were then added 23 parts of triethylene tetramine and 108 parts of 37% formaldehyde (neutralized with sodium hydroxide) and the mixture heated at 95° C. for an hour. The condensate was then heated in an oven at 130° C. for 16 hours, crushed, screened to 20/40 mesh, washed with water, with a 5% sodium carbonate solution, and again with water, and air-dried. The capacity of the resulting composition was 110 milligrams of sulfuric acid per gram when used in a column. Physical properties were very satisfactory as to lack of solubility and as to strength.

*Example 4*

23 parts of triethylene tetramine was adjusted with hydrochloric acid to pH 3 and mixed with 100 parts of quebracho in 200 parts of water, and with 108 parts of 37% formaldehyde. The mixture was heated at 95° C. for an hour. The condensate thus prepared was heated in an oven at 130° C. for 16 hours to form an insoluble resinous composition which was crushed, screened to 20/40 mesh, washed with water, with a 5% sodium carbonate solution, and again with water, and air-dried. While this resin had essentially the same capacity for anion absorption as resins from Examples 2 and 3, it was superior to these resins in physical properties.

*Example 5*

A solution of 100 parts of Borneo cutch was made in 200 parts of water at 95° C., cooled to 40° C., and treated with 108 parts of aqueous 37% formaldehyde. There was then added 60 parts of tetraethylene pentamine, the temperature being allowed to rise. When the reaction had subsided, the mixture was cooled to about 60° C., 108 parts of aqueous 37% formaldehyde added, and the reaction mixture heated to about 95° C. for an hour. There resulted a gel which was removed from the reaction vessel and dried in an oven at 110° C. for 20 hours to give a hard, insoluble resin. This was crushed, screened, washed with 5% sodium carbonate solution and then with water, and dried at 60° C.

The resins prepared as described may be used in the forms shown above. They may also be extended with inert material, silica, alpha floc, and alumina being typical carriers, which may be mixed, for example, with the gel. The various resinous compositions herein described may be used in conjunction with hydrogen-exchange materials to effect removal of both ions of a salt in a solution. In this respect, it should be noted that the catechol-type phenolic tannins-formaldehyde-polyamine resins themselves have some capacity for the exchange of cations.

The resinous compositions prepared by the above methods may be used for the purification of liquids or the purification of gases. They may be used to absorb acids or to replace salt-forming anions with hydroxyl ions in liquids containing an ionizable substance or to replace one salt-forming anion with another such anion, as sulfate for chloride. When the resinous composition has become saturated in respect to an acid or anion, the composition may be regenerated by treating with a solution containing the required anion. The adsorption of anions is, therefore, reversible and permits regeneration by a simple procedure.

We claim:

1. An insoluble nitrogenous resinous composition suitable for ion exchange which comprises the product obtained by reacting by condensing together in an aqueous medium a tannin of the catechol type, from 0.23 up to 2 parts by weight of an alkylene polyamine to one part of said tannin, and formaldehyde in an amount such that the mols thereof equal at least the sum of mols of polyamine and of phenolic bodies from the tannin, continuing the reaction of the three components until a hydrophilic, resinous gel is formed, and heating said gel between about 70° C. and the scorching temperature of the resulting resin until said resin is insoluble in dilute strong acids, said resinous composition being further characterized by hardness, suitability for use in columns and large scale apparatus, capacity for absorbing acidic constituents from fluids, and stability during repeated use and regeneration.

2. An insoluble nitrogenous resinous composition suitable for ion exchange which comprises the product obtained by reacting by condensing together in an aqueous medium a tannin of the catechol type, from 0.23 up to 2 parts by weight of a polyethylene polyamine to one part of said tannin, and formaldehyde in an amount such that the mols thereof equal at least the sum of mols of polyamine and of phenolic bodies from the tannin, continuing the reaction of the three components until a hydrophilic, resinous gel is formed, and heating said gel between about 70° C. and the scorching temperature of the resulting resin until said resin is insoluble in dilute strong acids, said resinous composition being further characterized by hardness, suitability for use in columns and large scale apparatus, capacity for absorbing acidic constituents from fluids, and stability during repeated use and regeneration.

3. An insoluble nitrogenous resinous composition suitable for ion exchange which comprises the product obtained by reacting by condensing together in an aqueous medium a tannin of the catechol type, from 0.23 up to 2 parts by weight of tetraethylene pentamine to one part of said tannin, and formaldehyde in an amount such that the mols thereof equal at least the sum of mols of tetraethylene pentamine and of phenolic bodies from the tannin, continuing the reaction of the three components until a hydrophilic, resinous gel is formed, and heating said gel between about 70° C. and the scorching temperature of the resulting resin until said resin is insoluble in dilute strong acids, said resinous composition being further characterized by hardness, suitability for use in columns and large scale apparatus, capacity for absorbing acidic constituents from fluids, and stability during repeated use and regeneration.

4. A resinous composition according to claim 3 in which the tannin is quebracho.

5. An insoluble nitrogenous resinous composition suitable for ion exchange which comprises the product obtained by reacting by condensing together in an aqueous medium a tannin of the catechol type, from 0.23 up to 2 parts by weight of triethylene tetramine to one part of said tannin, and formaldehyde in an amount such that the mols thereof equal at least the sum of mols of triethylene tetramine and of phenolic bodies from the tannin, continuing the reaction of the three components until a hydrophilic, resinous gel is formed, and heating said gel between about 70° C. and the scorching temperature of the resulting resin until said resin is insoluble in dilute strong acids, said resinous composition being further characterized by hardness, suitability for use in columns and large scale apparatus, capacity for absorbing acidic constituents from fluids, and stability during repeated use and regeneration.

6. A resinous composition according to claim 5 in which the tannin is quebracho.

7. An insoluble nitrogenous resinous composition suitable for ion exchange which comprises the product obtained by reacting by condensing together in an aqueous medium a tannin of the catechol type, from 0.23 up to 2 parts by weight of diethylene triamine to one part of said tannin, and formaldehyde in an amount such that the mols thereof equal at least the sum of mols of diethylene triamine and of phenolic bodies from the tannin, continuing the reaction of the three components until a hydrophilic, resinous gel is formed, and heating said gel between about 70° C. and the scorching temperature of the resulting resin until said resin is insoluble in dilute strong acids, said resinous composition being further characterized by hardness, suitability for use in columns and large scale apparatus, capacity for absorbing acidic constituents from fluids, and stability during repeated use and regeneration.

8. A resinous composition according to claim 7 in which the tannin is quebracho.

9. A method for preparing insoluble nitrogenous resinous compositions suitable for ion exchange and further characterized by hardness, suitability for use in columns, capacity for absorbing acidic constituents from fluids, and stability during repeated use and regeneration, which comprises reacting by condensing together in an aqueous medium a tannin of the catechol type, from 0.23 up to 2 parts by weight of an alkylene polyamine to one part of said tanning, and formaldehyde in an amount such that the mols thereof equal at least the sum of mols of said polyamine and of phenolic bodies from the tannin, continuing the reaction of the three components until a hydrophilic, resinous gel is formed, and heating said gel between about 70° C. and the scorching temperature of the resulting resin until said resin is insoluble in dilute strong acids.

10. A method for preparing insoluble nitrogenous resinous compositions suitable for ion exchange and further characterized by hardness, suitability for use in columns, capacity for absorbing acidic constituents from fluids, and stability during repeated use and regeneration, which comprises reacting by condensing together in an aqueous medium a tannin of the catechol type, from 0.23 up to 2 parts by weight of a polyethylene polyamine to one part of said tannin, and formaldehyde in an amount such that the mols thereof equal at least the sum of mols of said polyamine and of phenolic bodies from the tannin, continuing the reaction of the three components until a hydrophilic, resinous gel is formed, and heating said gel between about 70° C. and the scorching temperature of the resulting resin until said resin is insoluble in dilute strong acids.

11. A method for preparing insoluble nitrogenous resinous compositions suitable for ion exchange and further characterized by hardness, suitability for use in columns, capacity for absorbing acidic constituents from fluids, and stability during repeated use and regeneration, which comprises reacting by condensing together in an aqueous medium a tannin of the catechol type, from 0.23 up to 2 parts by weight of tetraethylene pentamine to one part of said tannin, and formaldehyde in an amount such that the mols thereof equal at least the sum of mols of said tetraethylene pentamine and of phenolic bodies from the tannin, continuing the reaction of the three components until a hydrophilic, resinous gel is formed, and heating said gel between about 70° C. and the scorching temperature of the resulting resin until said resin is insoluble in dilute strong acids.

12. The method of claim 11 in which the tannin is quebracho.

13. A method for preparing insoluble nitrogenous resinous compositions suitable for ion exchange and further characterized by hardness, suitability for use in columns, capacity for absorbing acidic constituents from fluids, and stability during repeated use and regeneration, which comprises reacting by condensing together in an aqueous medium a tannin of the catechol type, from 0.23 up to 2 parts by weight of triethylene tetramine to one part of said tannin, and formaldehyde in an amount such that the mols thereof equal at least the sum of mols of said triethylene tetramine and of phenolic bodies from the tannin, continuing the reaction of the three components until a hydrophilic, resinous gel is formed, and heating said gel between about 70° C. and the scorching temperature of the resulting resin until said resin is insoluble in dilute strong acids.

14. The method of claim 13 in which the tannin is quebracho.

15. A method for preparing insoluble nitrogenous resinous compositions suitable for ion exchange and further characterized by hardness, suitability for use in columns, capacity for absorbing acidic constituents from fluids, and stability during repeated use and regeneration, which comprises reacting by condensing together in an aqueous medium a tannin of the catechol type, from 0.23 up to 2 parts by weight of diethylene triamine to one part of said tannin, and formaldehyde in an amount such that the mols thereof equal at least the sum of mols of said diethylene triamine and of phenolic bodies from the tannin, continuing the reaction of the three components until a hydrophilic, resinous gel is formed, and heating said gel between about 70° C. and the scorching temperature of the resulting resin until said resin is insoluble in dilute strong acids.

16. The method of claim 15 in which the tannin is quebracho.

17. A method for preparing insoluble nitrogenous resinous compositions suitable for ion exchange and further characterized by hardness, suitability for use in columns, capacity for absorbing acidic constituents from fluids, and stability during repeated use and regeneration which comprises reacting by condensing together in an acidic aqueous medium a tannin of the catechol type, from 0.23 up to 2 parts by weight of a polyethylene polyamine to one part of said tannin, said polyamine being at least partly in the form of an acid salt, and formaldehyde in an amount more than molecularly equivalent to both polyamine and phenolic bodies of the tannin, continuing the reaction of the three components until a hydrophilic, resinous gel is formed, and heating said gel between about 70° C. and the scorching temperature of the resulting resin until said resin is substantially insoluble in dilute strong acids.

JOHN W. EASTES.
CHARLES AVERILL.